(12) United States Patent
Wu et al.

(10) Patent No.: US 9,807,313 B2
(45) Date of Patent: Oct. 31, 2017

(54) METHOD AND SYSTEM OF INCREASING INTEGER DISPARITY ACCURACY FOR CAMERA IMAGES WITH A DIAGONAL LAYOUT

(71) Applicant: INTEL CORPORATION, Santa Clara, CA (US)

(72) Inventors: Yi Wu, San Jose, CA (US); Yong Jiang, Shanghai (CN); Oscar Nestares, San Jose, CA (US); Kalpana Seshadrinathan, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 300 days.

(21) Appl. No.: 14/666,435

(22) Filed: Mar. 24, 2015

(65) Prior Publication Data

US 2016/0198138 A1 Jul. 7, 2016

Related U.S. Application Data

(60) Provisional application No. 62/099,270, filed on Jan. 2, 2015.

(51) Int. Cl.
*G06K 9/00* (2006.01)
*H04N 5/247* (2006.01)
*G06T 7/00* (2017.01)
*G06T 7/593* (2017.01)

(52) U.S. Cl.
CPC ............ *H04N 5/247* (2013.01); *G06T 7/593* (2017.01); *G06T 7/97* (2017.01); *G06T 2207/10012* (2013.01); *G06T 2207/20228* (2013.01)

(58) Field of Classification Search
None
See application file for complete search history.

(56) References Cited

U.S. PATENT DOCUMENTS

| 2005/0100207 A1* | 5/2005 | Konolige ............... G06T 7/20 382/154 |
| 2010/0271511 A1* | 10/2010 | Ma ................. H04N 13/0011 348/239 |
| 2013/0147922 A1 | 6/2013 | Nanri et al. |
| 2013/0294684 A1 | 11/2013 | Lipton et al. |
| 2014/0161306 A1 | 6/2014 | Ma et al. |
| 2014/0341292 A1 | 11/2014 | Schwarz et al. |
| 2015/0138346 A1* | 5/2015 | Venkataraman ....... G01B 11/22 348/135 |

FOREIGN PATENT DOCUMENTS

KR 20130120730 A 11/2013

OTHER PUBLICATIONS

International Search Report and Written Opinion for International Patent Application No. PCT/US2015/063430, dated Apr. 8, 2016 11 pages.
International Preliminary Report on Patentability for International Patent Application No. PCT/US2015/063430, dated Jul. 13, 2017.

* cited by examiner

*Primary Examiner* — Sumati Lefkowitz
*Assistant Examiner* — David Perlman
(74) *Attorney, Agent, or Firm* — Green, Howard & Mughal LLP.

(57) ABSTRACT

A system, article, and method of increasing integer disparity accuracy for camera images with a diagonal layout.

21 Claims, 9 Drawing Sheets

OBTAIN IMAGE DATA OF MULTIPLE IMAGES OF THE SAME SCENE HAVING AT LEAST ONE DIAGONALLY ARRANGED PAIR OF IMAGES INCLUDING A FIRST IMAGE AND A SECOND IMAGE
302

DETERMINE MULTIPLE CORRESPONDING POTENTIAL DISPARITY POINTS ON THE SECOND IMAGE TO CORRESPOND TO A FIRST POINT ON A FIRST IMAGE, AND WHEREIN EACH POTENTIAL DISPARITY POINT IS DISPLACED ONE OF A RANGE OF INTEGER DISPARITY VALUES AWAY FROM A POSITION ON THE SECOND IMAGE THAT CORRESPONDS TO THE LOCATION ON THE FIRST IMAGE OF THE FIRST POINT, WHEREIN THE RANGE OF INTEGER DISPARITY VALUES IS DISPOSED ALONG A DIAGONAL EPIPOLAR LINE EXTENDING FROM THE FIRST POINT AND THE POSITION ON THE SECOND IMAGE
304

DETERMINE WHICH DISPARITY POINT OF THE POTENTIAL DISPARITY POINTS CORRESPONDS TO THE FIRST POINT DEPENDING ON A MATCHING COST OF THE INDIVIDUAL POTENTIAL DISPARITY POINTS DETERMINED BY USING FEATURE VALUES ASSOCIATED WITH MULTIPLE NEIGHBOR POINTS NEAR THE INDIVIDUAL POTENTIAL DISPARITY POINTS AND BY USING FEATURE VALUES ASSOCIATED WITH THE FIRST POINT
306

- OBTAIN IMAGE DATA OF MULTIPLE CAMERA IMAGES OF A CAMERA ARRAY WITH AT LEAST ONE DIAGONAL PAIR OF IMAGES 402
- DETERMINE POTENTIAL PIXEL PAIRS DEPENDING ON THE DISPARITY 404
- DETERMINE MATCHING COST FOR EACH POTENTIAL PIXEL PAIR 406
  - OBTAIN NON-INTEGER SHIFT OF POTENTIAL DISPARITY POINT 408
  - OBTAIN ROUNDED DISPARITY POINT COMPONENT VALUES OF NEIGHBOR POINTS 410
  - USE THE NEIGHBOR POINTS TO GENERATE AN ERROR MAP 412
    - DETERMINE FEATURE VALUES FOR THE FIRST POINT AND THE NEIGHBOR POINTS 414
    - DETERMINE A MATCHING FEATURE COST VALUE FOR EACH NEIGHBOR POINT 416
    - DETERMINE MATCHING COST FOR INDIVIDUAL POTENTIAL DISPARITY POINTS 418
- DETERMINE FINAL INTEGER DISPARITY VALUE BASED ON THE ERROR MAP 420

METHOD AND SYSTEM OF INCREASING INTEGER DISPARITY ACCURACY FOR CAMERA IMAGES WITH A DIAGONAL LAYOUT

CROSS-REFERENCE TO RELATED APPLICATION

This application claims the benefit of U.S. Provisional Application No. 62/099,270, filed Jan. 2, 2015, which is incorporated herein for all purposes.

BACKGROUND

Camera arrays, which may be provided on tablets or smartphones for example, may be provided to capture multiple images of the same scene except from different angles. These images can then be used to generate a 3D space or depth map, and accurately locate objects form the scene and into the 3D space. Some of these camera arrays have a layout that arranges the cameras in a diagonal position relative to each so that rectified images from the cameras form a diagonal epipolar line between matching points between a pair of the cameras in the camera array.

With the processing of multiple images from a camera array, pixel disparities may be computed for many different applications. A disparity is the pixel location difference of a same 3D point from one image to another image. The disparity may be used for applications such as 3D depth extraction, refocus, measurement, layer effect, view interpolation, and so forth. It is convenient to maintain the disparity values as integer numbers that may correspond to a number of pixels in a grid of pixels to relate a distance, and for a number of applications and for processing efficiency. In order to determine the correspondence of points (and therefore the disparity) in a search for a disparity value along a diagonal epipolar line, however, the disparity is measured along the line in the diagonal. In this case, the x and y components of the diagonal integer disparity are not integers, and therefore do not correspond to an exact pixel location on a grid of pixels. Rounding by providing integer x and y values and to the nearest pixel location often results in some pixel points (and in turn the disparity length represented by the point) along the epipolar line being without a disparity value, and other point values along the epipolar line having two disparity positions along the line. This results in inaccurate disparities for some of the image points that can result in inaccurate 3D depth measurement of objects in the scene or other visible artifacts.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a flow chart of a method of increasing integer disparity accuracy for multiple images with a diagonal layout;

FIG. 4 is another flow chart of a method of increasing integer disparity accuracy for multiple images with a diagonal layout;

DETAILED DESCRIPTION

Figure 1:
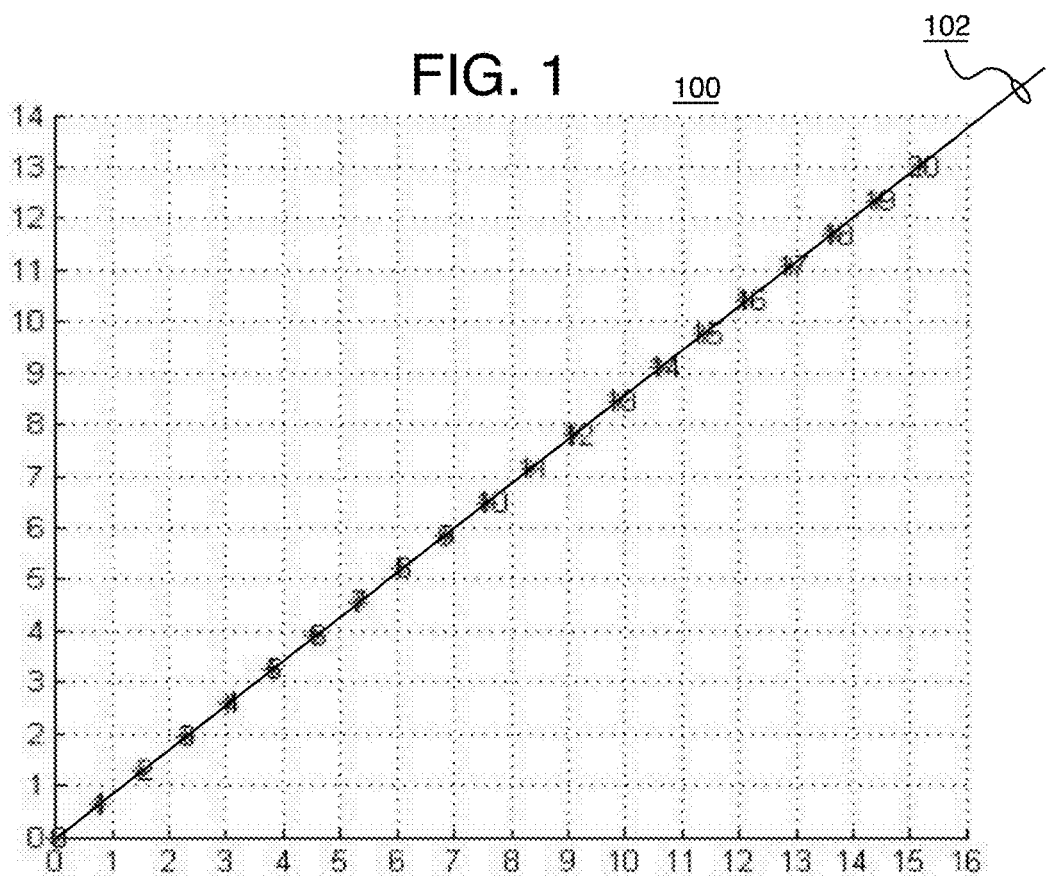
FIG. 1 is a schematic diagram of a pixel grid of an image with a diagonal epipolar line.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets with multiple cameras, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of increasing integer disparity accuracy for camera images with a diagonal layout.

As mentioned above, the disparity may be a fundamental component of many depth related applications, such as 3D depth extraction, refocus, measurement, layer effect, view interpolation, to name a few examples. A disparity is the difference in position of the same corresponding point from image to image. The disparities for each point on an image are conventionally measured in integer pixel count values. Also as mentioned, a diagonal spatial layout of cameras in a camera array creates technical difficulties in matching points along diagonal epipolar lines extending image to image where the images correspond to diagonal camera pairs because an integer count of pixel spaces along a diagonal epipolar line does not necessarily fall upon the exact pixel locations on a typical horizontal row and vertical column layout of pixels that form an image.

Referring to FIG. 1 to explain this difficulty, points for an integer disparity search along a diagonal epipolar line 102 is shown on a pixel grid 100. The grid 100 represents an image pixel coordinate system. As used herein, the true epipolar line is referred to as existing along or on the line from camera to camera centers of two cameras. Thus, for rectified images transformed to a common plane, the true epipolar line as the line joining the camera centers may be represented by a line forming the projected camera centers on the two images. Further, the lines matching corresponding pixels or points on the rectified images should be parallel to the true epipolar line. Thus, these matching lines may be referred to as a local or matching epipolar line or simply epipolar line instead of stating a line parallel to the true epipolar line. Thus, any mention of epipolar line herein may be to either the true or local epipolar line depending on the context. Relevant here, when two cameras, and in turn their rectified images, are placed in a diagonal arrangement, the epipolar line from a point on one image to a matching or corresponding point on the other is diagonal to correspond to layout of the images. Thus, a search for a matching point is performed along the diagonal epipolar line.

Each grid corner (or each intersection of lines) on image grid 100 corresponds to a pixel and a point that may have a corresponding match on another image. A disparity algorithm finds the pixel or point correspondence between two images by comparing the point (the point to be matched) on one image to each potential matching point in a range of such points along the epipolar line on the other image starting with 0 (which is the same corresponding location on the image with the point to be matched) up to a maximum, here point 20. A shift value to a different point (1 to 20) between two corresponding pixels is called the disparity value for that pixel. For example, for a given pixel (x, y) on one image, a search along the epipolar line 102 in another of the images is performed to find a matching pixel (x+dx, y+dy) in the range of d={0, 1, 2, . . . , maxD} where maxD in this example is 20, where d is extending diagonally along the epipolar line, and where d is limited to integer values, except that disparity value d is as follows:

$$d = \text{sqrt}((dx*dx)+(dy*dy)) \quad (1)$$

To maintain d as an integer, this results in non-integer values of dx and dy which does not match the pixel locations as shown on grid 100 wherever one of the asterisks (*) does not fall exactly on a grid intersection.

In other words, when two cameras are aligned diagonally, the search path is along the diagonal epipolar line. The numbered asterisks along epipolar line 102 represent the exact location and value of diagonal integer disparity d, which is d=0, 1, 2, . . . along the diagonal epipolar line 102. Thus, by one form, d is a measure of the same pixel to pixel grid distance as that forming the horizontal and vertical lines of the pixel grid 100. Since many of the points are not located on image pixel positions (not on the grid line intersections) for a particular integer disparity d, there is no such integer pixel correspondence (x+dx, y+dy) in the image. In contrast, traditional stereo vision handles images that are vertically or horizontally aligned, i.e., d=dx, or d=dy. Therefore, the integer disparity always has a corresponding integer image pixel in such a conventional system and the problems of diagonal matching have not been addressed.

Figure 2:
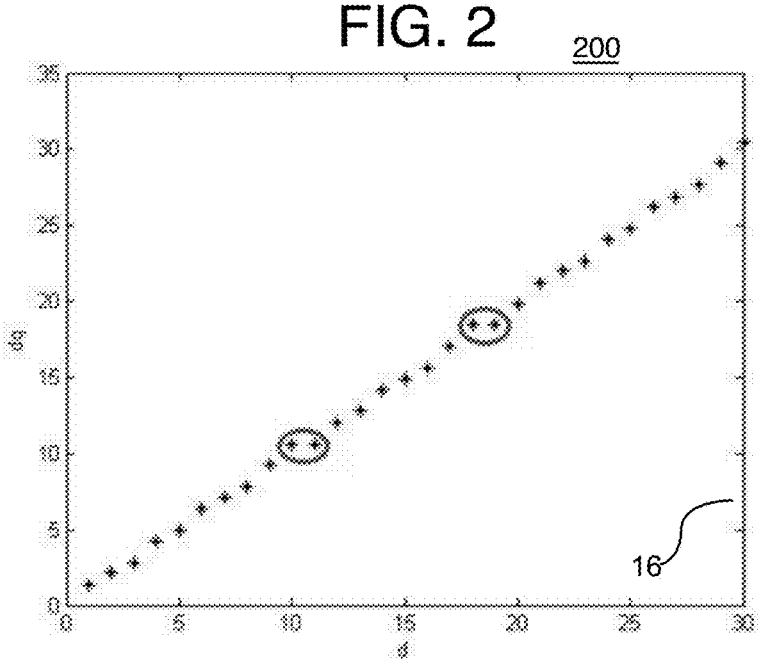
FIG. 2 is a chart of actual disparity values versus rounded disparity values.

Referring to FIG. 2, one attempt to overcome these issues was to provide an integer disparity algorithm to determine disparities along a diagonal epipolar line using a simple method of rounding to the nearest integer pixel. This had a significant disadvantage because it skipped certain disparity values. Specifically, a graph 200 provides an x-axis with integer disparity values d that are obtained from along a diagonal epipolar line, and with values ranging from 0 to 30. The y-axis of the graph is the calculated disparity dq value using a simple rounding equation. Thus, the integer value disparity d was used to determine non-integer dx and dy components. The dx and dy components were then rounded to the nearest integer, and equation (1) above was used with the rounded components (dqx, dqy) to calculate a new rounded integer disparity dq. As shown in graph 200, for d=10 and 11, both round to the same dq=10; and for d=19 and 20, both round to the same dq=19. Thus, the result of this quantization-type issue is that potential matching points that would provide disparity values of 11 and 20 in a range of potential disparity values to 30 are missing from being a potential disparity output, which will result in inaccuracies that could be significant in the computations of applications that use disparity that as mentioned above, could result in inaccurate 3D measurement or noticeable artifacts in the image as some examples.

To resolve these issues, the present method of increasing integer disparity accuracy for cameras with at least one diagonal layout of camera pairs is provided. The method includes using the image data of neighborhood (or neighbor) grid points near each potential disparity point to determine the best grid location and value for the disparity. Thus, by one example form, the method uses neighbor points in a feature cost bilinear interpolation to address the issue of no corresponding integer pixels in the image, which is explained in detail below. Basically, an integer disparity d is selected for each point (x, y) along a diagonal epipolar line on the reference image and that provides the smallest error (or difference) of image features using an equation that factors in the feature difference value associated with a number of neighbor points. The feature difference values may be weighted depending on how close the neighbor point is to the non-integer disparity point associated with a potential disparity point on the epipolar line as explained below.

Referring to FIG. 3, process 300 is provided for a method of increasing integer disparity accuracy for camera images with a diagonal layout. In the illustrated implementation, process 300 may include one or more operations, functions or actions 302 to 306 numbered evenly. By way of non-limiting example, process 300 may be described herein with reference to example image capture array 500 of FIG. 5 and 1000 of FIG. 10 respectively, and where relevant.

Process 300 may include "obtain image data of multiple images of the same scene having at least one diagonally arranged pair of the images including a first image and a second image" 302. Particularly, the images may be captured from a camera array that has a layout with at least two cameras positioned at a diagonal relative to each other such that diagonal epipolar lines are formed as explained below. The images that correspond to the cameras from the array form a diagonal relationship with each other.

Process 300 may include "determine multiple corresponding potential disparity points on the second image to correspond to a first point on a first image, and wherein each potential disparity point is displaced one of a range of integer disparity values away from a position on the second image that corresponds to the location on the first image of the first point, wherein the range of integer disparity values is disposed along a diagonal epipolar line extending from the first point and the position on the second image" 304. Particularly, an epipolar line extends from a first point on a first image and through the same corresponding location on the second image to find a matching point and disparity for the first point and along the epipolar line on the second image. The potential disparity points or values may be numbered or measured from 0 at the corresponding location to a maximum number similar to that as shown on FIG. 1 or FIG. 5.

Process 300 may include "determine which disparity point of the potential disparity points corresponds to the first point depending on a matching cost of the individual potential disparity points determined by using feature values associated with multiple neighbor points near the individual potential disparity points and by using feature values associated with the first point" 306. As explained below, a matching is determined for individual or each potential disparity point on the epipolar line. The matching cost is based, at least in part, on totaling the differences between feature values near the first point on the first image and the feature values near a number of neighbor points of a potential disparity point. A feature value may be a pixel related value such as color in RGB, grayscale or gradient values to name a few examples. A feature difference value may be formed for each pixel, and also may be determined by comparing a support region around a pixel, and by a comparison technique such as sum of absolute differences (SAD) by one example. A formula then may be used to weight the feature difference values depending on how close the neighbor value is to the potential disparity point, and by one example, using bilinear interpolation to determine the weighting. The total of the weighted feature difference values is then the matching cost. By one example, the potential disparity point with the lowest matching cost (or error value) is selected as the correct disparity and corresponding point relative to the first point.

Referring to FIG. 4, process 400 is provided for a method of increasing integer disparity accuracy for camera images with a diagonal layout. In the illustrated implementation, process 400 may include one or more operations, functions, or actions 402 to 420 numbered evenly. By way of non-limiting example, process 400 may be described herein with reference to example image capture array 500 of FIG. 5 and 1000 of FIG. 10 respectively, and where relevant.

Figure 5:
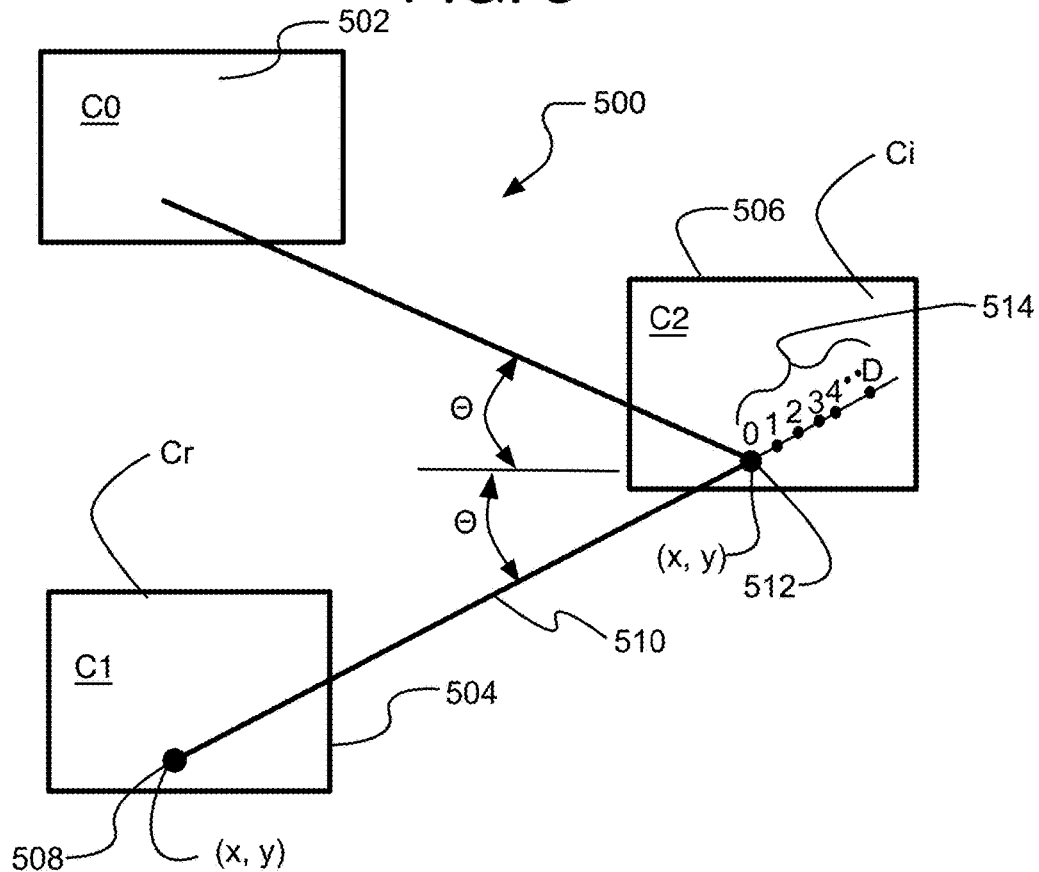
FIG. 5 is a schematic diagram showing a diagonal arrangement of cameras of a camera array.

While referring to FIG. 5, process 400 may include "obtain image data of multiple camera images with at least one diagonal pair of images" 402. Thus, example camera array 500 by form has at least one (here two) diagonal camera pairs represented by the images formed by the respective cameras. Thus, cameras C0, C1, and C2 are represented by the images 502, 504, 506 respectively and that the cameras form. An angle Θ from C2 to C0, or C2 to C1, and from horizontal may be different for each camera and its image. Image data may be provided for multiple images captured by the camera array and of the same scene or objects except from different views. The camera array may be on a single device or formed by separate devices. The images may be captured simultaneously or may be taken over time of a scene that does not move. Thus, it will be understood that the methods herein could be used with a single camera that takes multiple pictures of the same scene except by moving the camera to precise, known positions about the scene for each picture.

This operation also may include obtaining image data that includes features for each of the images including feature data such as color, grayscale, luminance (or gradients), census, and local binary pattern (LBP), and so forth. At least one of the chosen features may be used to determine a matching cost as explained below.

Also, this operation may include obtaining rectified images. This may include collecting a set of images from different perspectives or angles and of the same scene (whether captured simultaneously or not), and then transforming all of the images in the set to the same common plane. This enables corresponding points on two different images to be matched by using the local epipolar lines while viewing the images in the plane.

Process 400 then may include "determine potential pixel pairs depending on the disparity" 404. For instance, for each pair of cameras Cr and Ci (here chosen to be represented by image 504 and 506, respectively), a pixel (x, y) (or first point) 508 may be selected on the image Cr to determine a corresponding matching point and disparity on the other image Ci. A diagonal epipolar line 510 may extend from the first point 508 and through the same position (x, y) 512 on the image Ci. The first point 508 will then be compared to a range 514 of potential disparity points (to form potential pixel pairs for example) on the epipolar line 510 and in image 506. The range 514 of potential disparity points for comparison to the first point includes N (N=maxD+1) pixels along the epipolar line 510, and starting with pixel (x, y) 512 in Ci, and then with an integer pixel shift (or disparity) d of 0, 1, 2, ..., max D. For each pairing of pixels, the feature or matching cost of matching each of the pairs of two pixels is calculated as explained below, and may be used to determine which pair to set as the corresponding pair for further applications also as explained below. By one form, the pair with the lowest matching cost is selected.

Process 400 then may include "determine matching cost for each potential pixel pair" 406. This operation 406 may include "obtain non-integer shift of the potential disparity point" 408. Particularly, for camera arrays with a diagonal camera layout (or at least one diagonal camera pair), the pixel shift is along the diagonal epipolar line as mentioned above. For each diagonal pixel shift d (as an integer value), the process obtains (non-integer) component pixel shift on x and y axis as:

$$dx = d*\cos(\Theta) \quad (2)$$

$$dy = d*\sin(\Theta) \quad (3)$$

where dx and dy are often float values, which may be mapped to integers since the pixel coordinate is in integers, and where the angle $\Theta$ (FIG. 5) is the angle of the diagonal epipolar line from horizontal and from camera to camera. Thus, the non-integer coordinates of the potential disparity point including the shift is (x+dx, y+dy). It should be noted that for this example, (dx, dy) is measured from corresponding second image Ci point or position at (x, y) 512, and (x, y) does not change even though d is changing. To obtain rounded integer values for dx and dy, a simple method of rounding to the nearest integer pixel may be used, such that:

$$dqx = \text{round}(dx) \quad (4)$$

$$dqy = \text{round}(dy) \quad (5)$$

which is the type of rounding equation used below, and then the precise corresponding (non-integer) disparity pixel shift along the epipolar line and based on rounded horizontal and vertical pixel values is:

$$dq = \text{sqrt}((dqx*dqx) + (dqy*dqy)) \quad (6)$$

Figure 6:
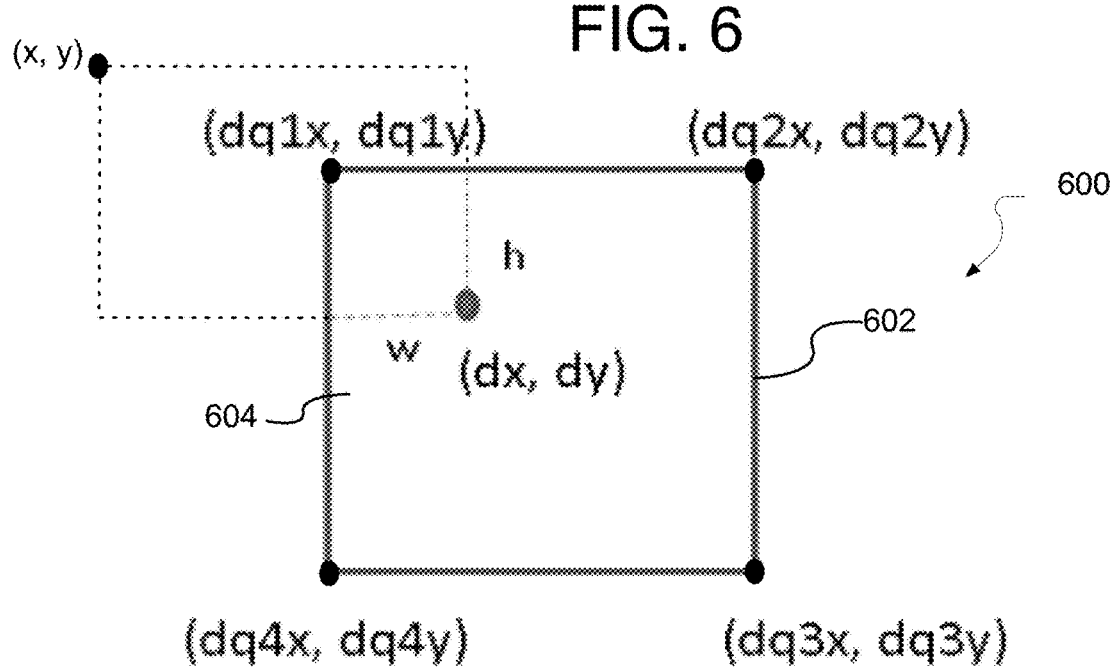
FIG. 6 is a schematic diagram of a portion of a grid arrangement with a disparity point to show bilinear interpolation for the method of increasing integer disparity accuracy for multiple images with a diagonal layout described herein.

Referring to FIG. 6, one way to determine the matching cost of the potential disparity point is to compare the feature values of neighbor points near the potential disparity point and to the feature values of the first point. Thus, process 400 may include "obtain rounded disparity point component values of neighbor points" 410. By one example, the four nearest neighbor points (or pixel locations or grid intersections) are used and that are at least generally positioned around the non-integer disparity point (x+dx, y+dy) shown as (dx, dy) from (x, y) on FIG. 6, or the four neighbor points form a square that includes the non-integer disparity point (x+dx, y+dy). This forms the coordinates of the neighbor points as well as the floor (the lowest possible value) and the ceiling ("ceil" as the highest possible value) for the coordinates of the area used to apply weights to the feature value differences as explained below. Thus, floor( ) and ceil( ) are rounding operations as mentioned above and to the next lower or higher horizontal or vertical round grid or pixel value as follows:

$$dq1x = \text{floor}(dx), \quad (7)$$

$$dq1y = \text{floor}(dy), \quad (8)$$

$$dq2x = \text{floor}(dx), \quad (9)$$

$$dq2y = \text{floor}(dy), \quad (10)$$

$$dq3x = \text{ceil}(dx), \quad (11)$$

$$dq3y = \text{ceil}(dy), \quad (12)$$

$$dq4x = \text{ceil}(dx), \quad (13)$$

$$dq4y = \text{ceil}(dy). \quad (14)$$

$$w = dx - dq1x \quad (15)$$

$$h = dy - dq1y, \quad (16)$$

where each value dqix and dqiy (where i=1 to 4 as recited above) may be the next even pixel location in the x and y directions from the non-integer disparity point (dx, dy) as shown on FIG. 6, where w and h are the horizontal and vertical distance respectively, from the top left neighbor pixel (dq1x, dq1y) and to (dx, dy). Of course, it could be alternatively set to match a sub-pixel level grid if desired to establish a count of certain sub-pixel fraction values. Other alternatives include using more or less neighbor points.

By one form, process 400 then may include "use the neighbor points to generate an error map" 412. The error map holds a matching cost or error for each potential disparity point (or each potential pixel pair) by factoring in the difference between feature values near the first point and the feature values near each of the neighbor points to the non-integer disparity point, and then weighting those values depending on how close the neighbor value is to the disparity point (dx, dy). This may be performed by using a bilinear interpolation equation approach to compute the matching cost for a disparity value by using the feature costs from neighbor points that are integer pixel locations as explained below. Equation 17 below forms an error map or relationship for determining matching cost for each disparity d and (dx, dy) of d as a bilinear interpolation:

$$E(d) = (1-w)*(1-h)*|Ir(x,y) - Ii(x+dqx1,y+dqy1)| + \\ w*(1-h)*|Ir(x,y) - Ii(x-dqx2,y+dqy2)| + w*h* \\ Ir(x,y) - Ii(x+dqx3,y-dqy3)| + (1-w)*h*|Ir(x,y) - \\ Ii(x-dqx4,y+dqy4)| \quad (17)$$

where Ir and Ii refer to support regions of image features of Cr and Ci, respectively. As mentioned herein, the image features may refer to color, grayscale, or gradient values of the pixels, for some examples. |Ir(x, y)−Ii(x+dqxi, y+dqyi)| is the feature difference value before weighting is applied, and refers to the local feature cost. Thus, building the error map may include at least three operations: (1) determine feature values for the first point and each neighbor point to be included for the comparison, (2) actually performing the comparison or subtraction, and (3) apply the weight factors. Thus, process 400 may include "determine feature values for first point and neighbor points" 414. By one example, the support region Ir(x, y) may be a certain pattern that includes the first point (x, y) on the image of the camera Cr, and may be a fixed area (sxs pixels for example that may be determined by experimentation and/or very by certain parameters). Alternatively, a support region may be determined on the image of the camera Cr by first extending each pixel (x, y) in four directions (left, right, up and down, and alternatively diagonals could be included) until the pattern hits a pixel for which the feature value for the selected feature, e.g. color, gradient or grayscale, exceeds a threshold difference or no longer meets a criteria for inclusion in the support region. In other words, the feature value for the selected pixel is compared to the feature value for each pixel in each direction until the difference exceeds a threshold (or doesn't meet a criteria) so that the support region has a controlled or limited range of a certain feature. So by one example for gray scale in a range of 0 to 255, the criteria may be that the value cannot vary by 40 from the first point value for example. The support region may be set similarly for the individual neighbor points. By another alternative, single feature values at the neighbor points could be used or some other definition of a support region. By yet more alternatives, only the neighbor point that is, or is within the nth, closest neighbor point to the non-integer disparity point forms a support region for comparison to the support region of the first point, but this of course uses an error at a single point or other number of points that is different from the bilinear equation (17). More, or other, explanation or examples for obtaining features and establishing the support region for a disparity point may be provided by U.S. patent application Ser. No. 14/542,040, filed Nov. 14, 2014, and published Mar. 10, 2016, which is incorporated herein for all purposes.

Process 400 then may include "determine a feature cost value for each neighbor point" 416. Thus, once the support region Ir on the image of the camera Cr image is set, then the support region Ir on the image of Cr is differenced (or SAD is computed) from the same overlapping area (the same pixel location points in the same pattern) of the support region Ii for each neighbor point. The feature cost values (also referred to as the feature difference values) are then plugged into equation (17) and the bilinear weighting factors of equation (17) can be applied.

Thus, process 400 then includes "determine matching cost for individual potential disparity points" 418. This includes performing the bilinear weight factors to the feature difference values depending on how close the respective neighbor point is to the disparity point (dx, dy), and specifically, the closer the points are, the greater the portion of the feature difference value of that closer point is used to determine the final matching cost or error. In the example of FIG. 6, point (dq1x, dq1y) will have the greatest portion of its feature cost included in the total matching cost since it is the closest neighbor point to (dx, dy). Thus, the result is a single matching cost or error value E(d) for the potential disparity point, which forms an error map of error values with one error value for each potential disparity point along the epipolar line.

It will be noted that other than bilinear interpolation techniques may be used such as bicubic interpolation.

Process 400 may include "determine final integer disparity value based on the error map" 418. Finally, the disparity value for a given pixel (x, y) in the reference camera Cr along the baseline is calculated by finding the minimum d in the error map.

$$d(x,y) = \mathop{\mathrm{argmin}}_{d} E(d) \quad (18)$$

In other words, for each point (x, y) on Cr, d diagonal integer values are tested from 0 to a maximum value D along the diagonal epipolar line, and the value with the lowest E(d) is selected as the final disparity or shift. By selecting the disparity based on neighbor points' matching cost, the process effectively avoids the issues of skipping potential integer disparity values, which improves the accuracy of the disparity output. The computed disparity then may be used in further applications.

Figure 7:
FIG. 7 is a picture captured with a camera array with the use of simple rounding without the use of the method of increasing integer disparity accuracy for camera arrays with a diagonal layout described herein.
Figure 8:
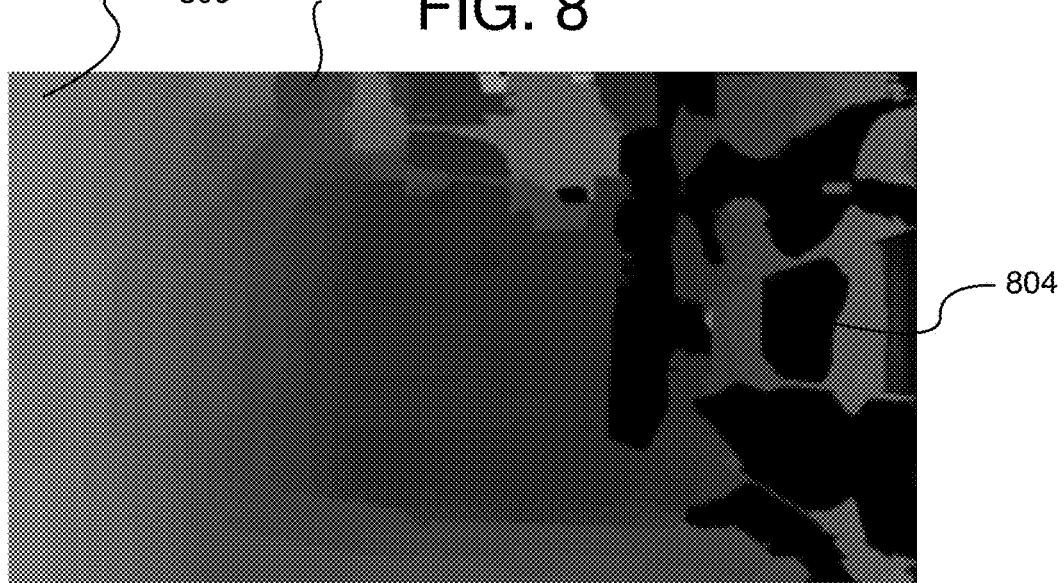
FIG. 8 is a picture captured with a camera array with the use of the method of increasing integer disparity accuracy for camera arrays with a diagonal layout described herein.

Referring to FIGS. 7-8, an image 700 provides an example of a disparity result of the conventional system with the use of simple rounding, and the depth layer of a board 704 and person 702 depicted in the image are merged into the background depth layer. With the use of neighbor points as described herein, a depth layer of the board 804 and person 802 can be distinguished from the background depth layer on image 800.

Figure 9:
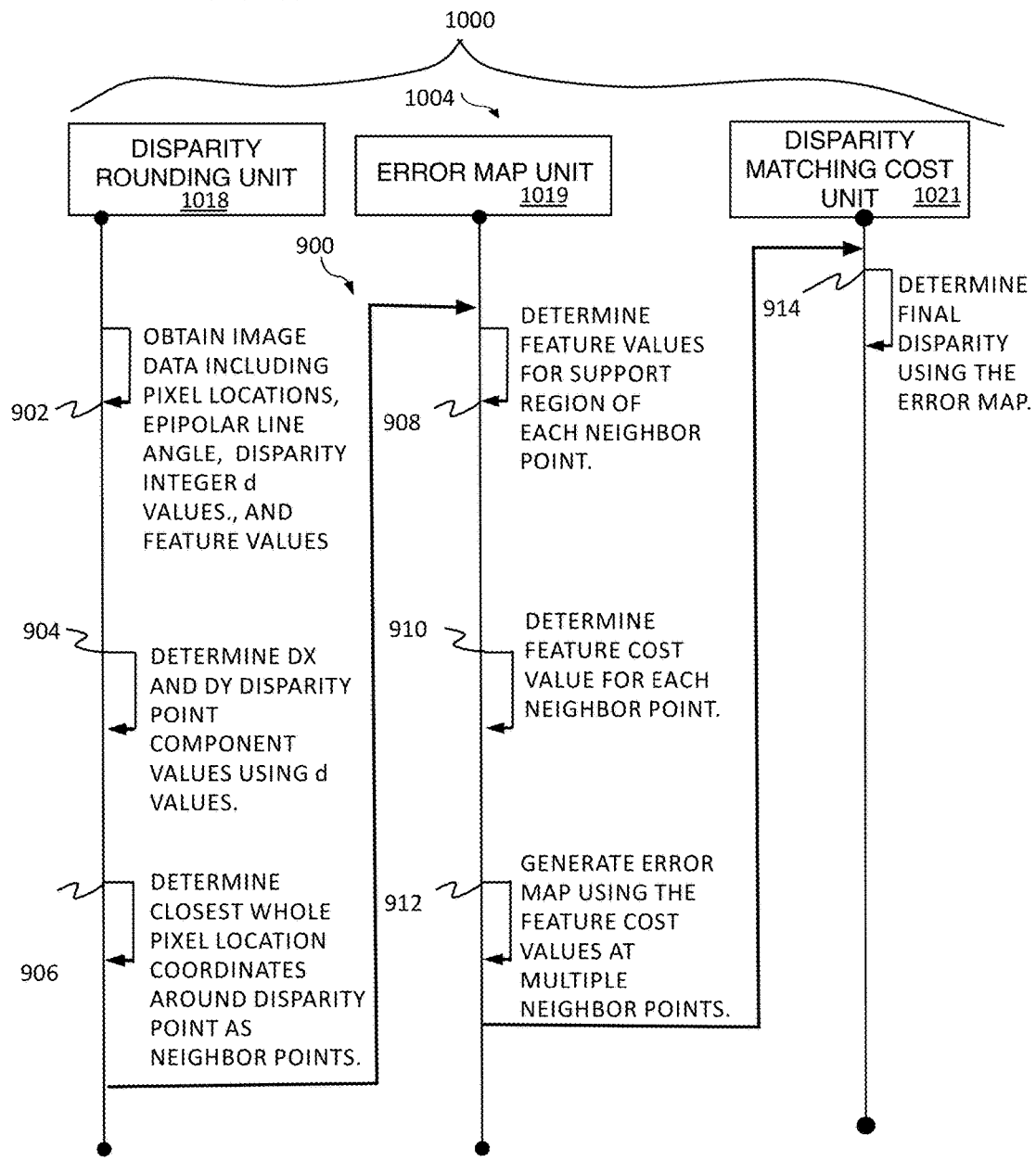
FIG. 9 is a schematic diagram showing a method of increasing integer disparity accuracy for camera arrays with a diagonal layout in operation.

Referring to FIG. 9, process 900 illustrates the operation of a sample image processing system 1000 that performs diagonal disparity accuracy calculations in accordance with at least some implementations of the present disclosure. In more detail, in the illustrated form, process 900 may include one or more operations, functions or actions as illustrated by one or more of actions 902 to 914 numbered evenly. By way of non-limiting example, process 900 will be described herein with reference to FIG. 10. Specifically, system 1000 includes logic units or modules 1004. The logic modules 1004 may include a rectification unit 1012 that transforms the camera images into a single common plane, and a point correspondence unit 1014 that determines the correspondence between a point on one image to a point on another image from cameras, and in some forms cameras in a camera array and produces disparity values. The point correspondence unit 1014 may have a diagonal disparity unit 1016. The diagonal disparity unit 1016 may have a disparity rounding unit 1018, an error map unit 1019, and a disparity matching cost unit 1021. The operation of the system may proceed as follows.

Process 900 may include "obtain image data including pixel locations, epipolar line angle, disparity integer d values, and feature values" 902, and as explained above, a range of integer d values to a maximum D value may be tested for each potential disparity point along a diagonal epipolar line on a second image to find the best match to a point on a first image also on the epipolar line. The feature values are features of the image such as color, grayscale, or gradient and so forth as explained above.

Process 900 may include "determine dx and dy disparity point component values using d values" 904, and as explained above, these values may be non-integer values that is the non-integer shift from the point (x, y) on the second image and corresponding to the first point (x, y) on the first image. By one example, dx and dy are determined by equation (2) and (3) above for each potential disparity point.

Process 900 may include "determine closest whole pixel location coordinates around disparity point as neighbor points" 906. By one form, this includes the next pixel locations (or nearest neighbor) left and right, and up and down, around the disparity point (x+dx, y+dy) or simply (dx, dy) as shown on FIG. 6, and computed by the rounding equations (7) to (14) by one example. This operation also may include computing the w and h values from equations (15) and (16) above.

Process 900 may include "determine feature values for support region of each neighbor point" 908, and as explained above, a certain area near each or individual neighbor points that have a similar feature value characteristic (such as color, grayscale, or gradient values) within a certain range, or meet other criteria, may be considered a support region. The portions of this neighbor point support region that overlaps the support region (in pixel location) used on the first point on the first image are set to be used to determine the feature cost for that neighbor point.

Process 900 may include "determine feature cost value for each neighbor point" 910, and by using a SAD or other equivalent computation as one example that is differencing the overlapping portion of the support region of the point on the first image with each overlapping portion of the support region of each neighbor point.

Process 900 may include "generate error map using the feature cost values at multiple neighbor points" 912, and as explained above by the use of example equation (17) in a bilinear interpolation equation that combines all of the feature costs of the neighbors of one potential disparity point. By one example, equation (17) is a weighted bilinear interpolation equation that provides greater weight the closer the neighbor point is to the non-integer disparity (dx, dy) point. This provides a single matching cost total associated with the potential disparity point, and in one form, each potential disparity point will have its own matching cost or error value to form an error map.

Process 900 then may include "determine final disparity using the error map" 914, and by use of example equation (18). This equation sets the final disparity point as the potential disparity point with the lowest matching cost (or error) from the error map. Thereafter, the resulting final disparity may be used for further applications as mentioned above.

In addition, any one or more of the operations of FIGS. 3-4 and 9 may be undertaken in response to instructions provided by one or more computer program products. Such program products may include signal bearing media providing instructions that, when executed by, for example, a processor may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 10:
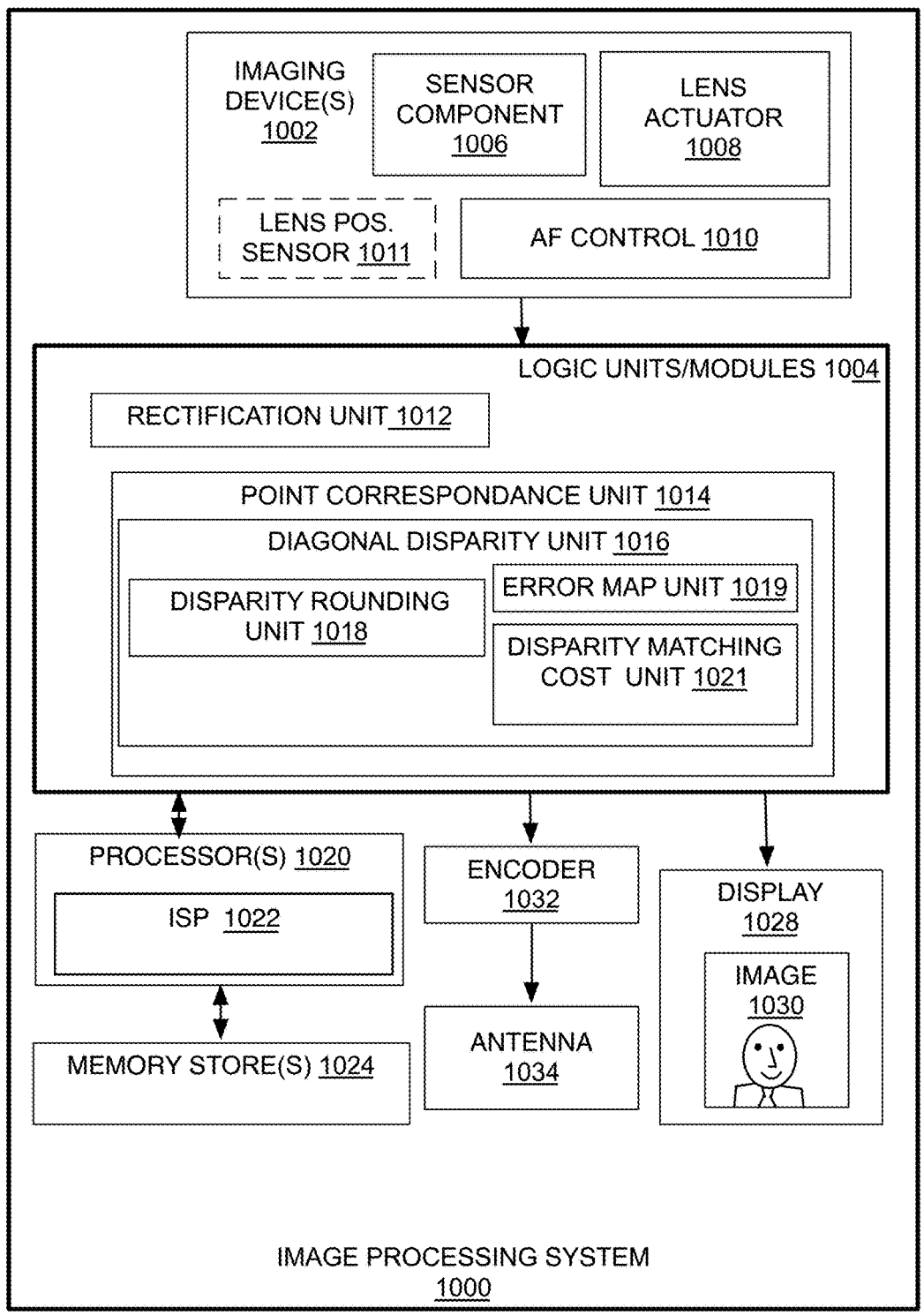
FIG. 10 is an illustrative diagram of an example system.

Referring to FIG. 10, an example image processing system 1000 is arranged in accordance with at least some implementations of the present disclosure. In various implementations, the example image processing system 1000 may have an imaging device 1002 to form or receive captured image data. This can be implemented in various ways. Thus, in one form, the image processing system 1000 may be one or more digital cameras or other image capture devices, and imaging device 1002, in this case, may be the camera hardware and camera sensor software, module, or component 1012. In other examples, imaging processing system 1000 may have an imaging device 1002 that includes or may be one or more cameras, and logic modules 1004 may communicate remotely with, or otherwise may be communicatively coupled to, the imaging device 1002 for further processing of the image data.

Thus, image processing device 1000 may be a single camera on a multi-camera device such as a smartphone, tablet, laptop, or other mobile device. Otherwise, device 1000 may be the tablet or other device with multiple cameras where the processing occurs at one of the cameras or at a separate processing location communicating with the cameras whether on or off of the tablet or other device, and whether the processing is performed at a mobile device or not. The device also may be a wearable device such as a smartwatch, exercise wristband, and/or smart glasses, for example.

In either case, such technology may include a camera such as a digital camera system, a dedicated camera device, or an imaging phone or tablet, whether a still picture or video camera or some combination of both. Thus, in one form, imaging device 1002 may include camera hardware and optics including one or more sensors as well as auto-focus, zoom, aperture, ND-filter, auto-exposure, flash, and actuator controls. These controls may be part of a sensor module or component 1006 for operating the sensor. The sensor component 1006 may be part of the imaging device 1002, or may be part of the logical modules 1004 or both. Such sensor component can be used to generate images for a viewfinder and take still pictures or video. The imaging device 1002 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 1002 may be provided with an eye tracking camera.

The imaging device 1002 also may have a lens actuator 1008 that has a lens and a lens driver or driver logic that receives commands to move the lens and applies an electrical current to move the lens. Optionally, the imaging device 1002 also may have an autofocus control 1010 and a lens position sensor 1011 to confirm lens positions if needed.

In the illustrated example, the logic modules 1004 may include a rectification unit 1012, and a point correspondence unit 1014 that determines the correspondence between a point on one image to a point on another image from cameras in a camera array. The point correspondence unit 1014 may have a diagonal disparity unit 1016. The diagonal disparity unit 1016 may have a disparity rounding unit 1018, an error map unit 1019, and a disparity matching cost unit 1021.

Any combination of the units of the logic modules 1004 may be operated by, or even entirely or partially located at, processor(s) 1020, and which may include an ISP 1022. The logic modules 1004 may be communicatively coupled to the components of the imaging device 1002 in order to receive raw image data that includes feature point data described herein. Optionally, the feature point data may be provided by a data stream separate from the raw image data stream. In these cases, it is assumed the logic modules 1004 are considered to be separate from the imaging device. This need not be so, and the logic modules very well may be considered to be part of the imaging device as well.

The image processing system 1000 may have one or more processors 1020 which may include a dedicated image signal processor (ISP) 1022 such as the Intel Atom, memory stores 1024 which may or may not hold disparity data mentioned herein, one or more displays 1028 to provide images 1030, encoder 1032, and antenna 1034. In one example implementation, the image processing system 100 may have the display 1028, at least one processor 1020 communicatively coupled to the display, at least one memory 1024 communicatively coupled to the processor. The encoder 1032 and antenna 1034 may be provided to compress the modified image date for transmission to other devices that may display or store the image. It will be understood that the image processing system 1000 may also include a decoder (or encoder 1032 may include a decoder) to receive and decode image data for processing by the system 1000. Otherwise, the processed image 1030 may be displayed on display 1028 or stored in memory 1024. As illustrated, any of these components may be capable of communication with one another and/or communication with portions of logic modules 1004 and/or imaging device 1002. Thus, processors 1020 may be communicatively coupled to both the image device 1002 and the logic modules 1004 for operating those components. By one approach, although image processing system 1000, as shown in FIG. 10, may include one particular set of blocks or actions associated with particular components or modules, these blocks or actions may be associated with different components or modules than the particular component or module illustrated here.

Figure 11:
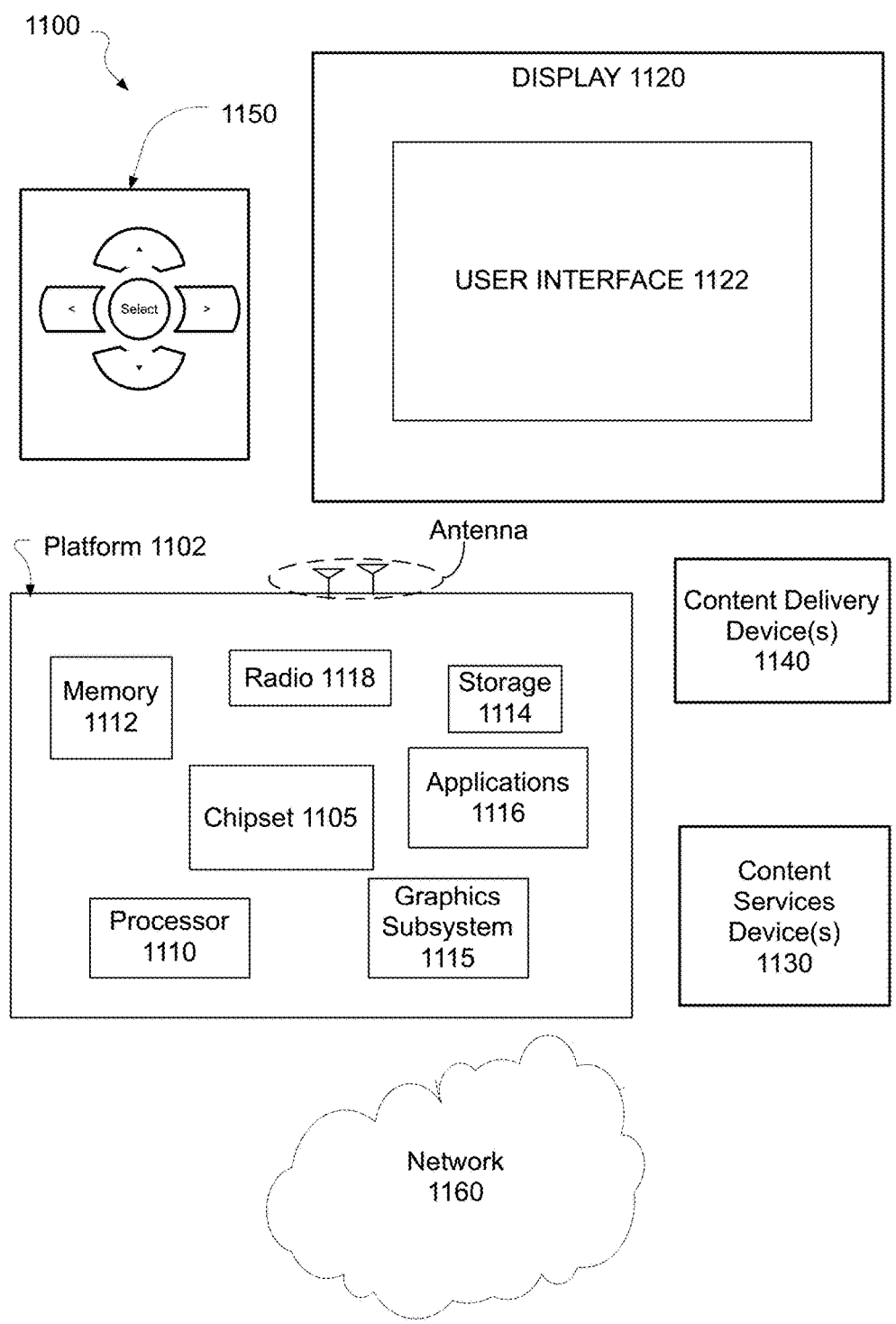
FIG. 11 is an illustrative diagram of another example system.

Referring to FIG. 11, an example system 1100 in accordance with the present disclosure operates one or more aspects of the image processing system described herein. It will be understood from the nature of the system components described below that such components may be associated with, or used to operate, certain part or parts of the image processing system described above. In various implementations, system 1100 may be a media system although system 1100 is not limited to this context. For example, system 1100 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth as long as the device has, or is part of, a camera array, or can otherwise be used to take multiple pictures to be analyzed together.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display and perform the image processing described above. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In implementations, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In implementations, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implementations, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various implementations, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 11.

Referring to FIG. 11, a small form factor device 1100 is one example of the varying physical styles or form factors in which system 900 and/or 1000 may be embodied. By this approach, device 1100 may be implemented as a mobile computing device having wireless capabilities and multiple cameras. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

Figure 12:
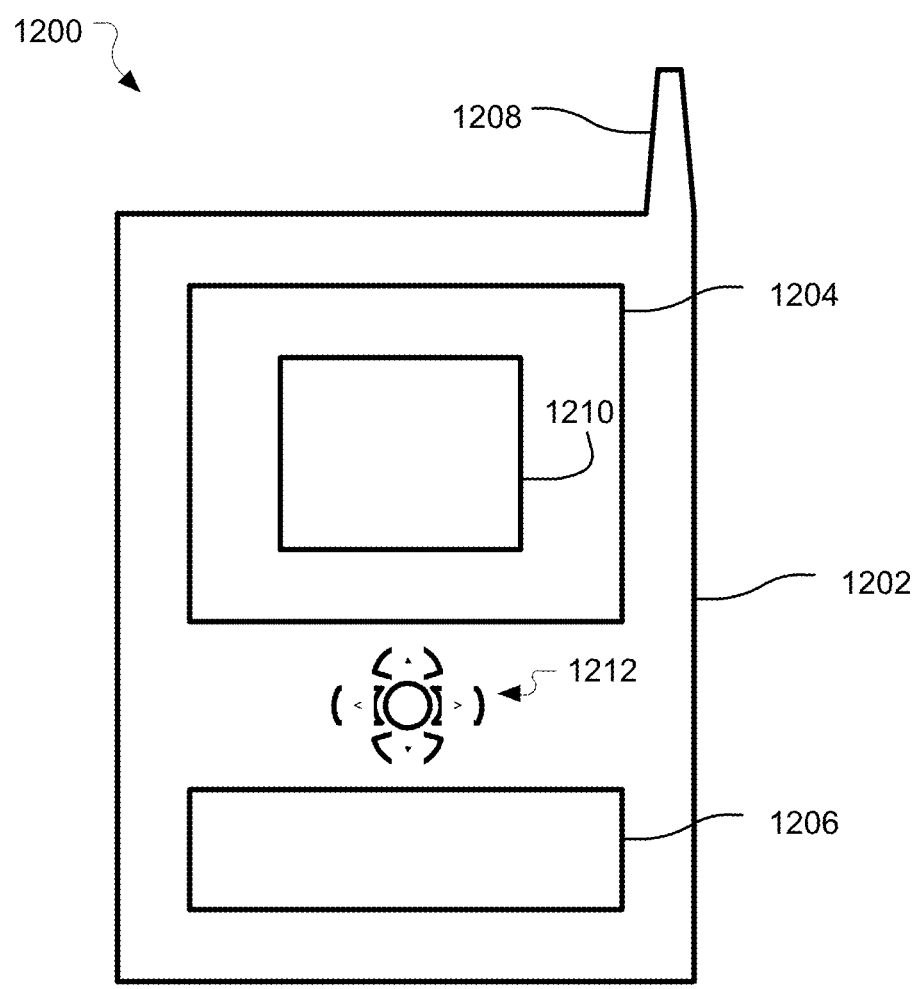
FIG. 12 illustrates another example device, all arranged in accordance with at least some implementations of the present disclosure.

As shown in FIG. 12, device 1200 may include a housing 1202, a display 1204 including a screen 1210, an input/output (I/O) device 1206, and an antenna 1208 (whether external as shown or internal and/or hidden such as on a wearable device). Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one implementation, a computer-implemented method of increasing integer disparity accuracy for camera images with a diagonal layout comprises obtaining image data of multiple images of the same scene having at least one diagonally arranged pair of the images including a first image and a second image; determining multiple corresponding potential disparity points on the second image to correspond to a first point on a first image, and wherein each potential disparity point is displaced one of a range of integer disparity values away from a position on the second image that corresponds to the location on the first image of the first point, wherein the range of integer disparity values is disposed along a diagonal epipolar line extending from the first point and the position on the second image; and determining which disparity point of the potential disparity points corresponds to the first point depending on a matching cost of the individual potential disparity points determined by using feature values associated with multiple neighbor points near the individual potential disparity points and by using feature values associated with the first point.

In another implementation of the method, the method may include that the diagonal pair of images corresponds to a diagonal arrangement of cameras in a camera array that captured the images; the method comprises: determining the matching cost by using bilinear interpolation with the feature values, wherein the feature values are based on color, gradient, or grayscale values at or near the neighbor points; selecting the four closest whole pixel points around the potential disparity point of non-integer coordinates as the neighbor points; determining the matching cost based on feature differences between the features values associated with the first point on the first image and the feature values associated with the individual neighbor points; and determining a feature difference value for individual neighbor points based on the feature differences of points in a support region on the first image and associated with the first point and support regions on the second image each associated with individual neighbor points.

The method also may include that at least one of the support regions is determined by including feature values of contiguous pixels points and including a neighbor point that all have a feature value of the same type of feature that meets a criteria; wherein the feature difference value is determined by using the overlapping pixel locations that are common in an overlap of the support region of a neighbor point on the second image and the support region of the first point on the first image; wherein the feature difference value is determined by using sum of absolute differences of the feature values of the area formed by the overlapping pixel locations; wherein the matching cost for a potential disparity point is determined, at least in part, by totaling the feature difference value from each of the neighbor points of the potential disparity point; wherein the matching cost for a potential disparity point is determined, at least in part, by weighting the feature difference values from individual neighbor points of the potential disparity point depending on how close the neighbor point is to a non-integer disparity point associated with the potential disparity point; and the method comprising selecting the potential disparity point as the final potential disparity point that has the lowest matching cost.

By yet another implementation, a computer-implemented system of increasing integer disparity accuracy for camera images with a diagonal layout comprises a display; at least one processor communicatively coupled to the display; at least one memory communicatively coupled to at least one processor; and a diagonal disparity unit operated by the processor and to: obtain image data of multiple images of the same scene having at least one diagonally arranged pair of the images including a first image and a second image; determine multiple corresponding potential disparity points on the second image to correspond to a first point on a first image, and wherein each potential disparity point is displaced one of a range of integer disparity values away from a position on the second image that corresponds to the location on the first image of the first point, wherein the range of integer disparity values is disposed along a diagonal epipolar line extending from the first point and the position on the second image; and determine which disparity point of the potential disparity points corresponds to the first point depending on a matching cost of the individual potential disparity points determined by using feature values associated with multiple neighbor points near the individual potential disparity points and by using feature values associated with the first point.

In a further implementation of the system, the system may include that the diagonal pair of images corresponds to a diagonal arrangement of cameras in a camera array that captured the images, the system having the diagonal disparity unit operated by the processor and to: determine the matching cost by using bilinear interpolation with the feature values, wherein the feature values are based on color, gradient, or grayscale values at or near the neighbor points; select the four closest whole pixel points around the potential disparity point of non-integer coordinates as the neighbor points; determine the matching cost based on feature differences between the features values associated with the first point on the first image and the feature values associated with the individual neighbor points; determine a feature difference value for individual neighbor points based on the feature differences of points in a support region on the first image and associated with the first point and support regions on the second image each associated with individual neighbor points.

The system may also include that at least one of the support regions is determined by including feature values of contiguous pixels points and including a neighbor point that all have a feature value of the same type of feature that meets a criteria; wherein the feature difference value is determined by using the overlapping pixel locations that are common in an overlap of the support region of a neighbor point on the second image and the support region of the first point on the first image; wherein the feature difference value is determined by using sum of absolute differences of the feature values of the area formed by the overlapping pixel locations wherein the matching cost for a potential disparity point is determined, at least in part, by totaling the feature difference value from each of the neighbor points of the potential disparity point; wherein the matching cost for a potential disparity point is determined, at least in part, by weighting the feature difference values from individual neighbor points of the potential disparity point depending on how close the neighbor point is to a non-integer disparity point associated with the potential disparity point; and the system having the diagonal disparity unit to select the potential disparity point as the final potential disparity point that has the lowest matching cost.

By yet a further implementation, a computer-readable medium having stored thereon instructions that when executed cause a computing device to obtain image data of multiple images of the same scene having at least one diagonally arranged pair of the images including a first image and a second image; determine multiple corresponding potential disparity points on the second image to correspond to a first point on a first image, and wherein each potential disparity point is displaced one of a range of integer disparity values away from a position on the second image that corresponds to the location on the first image of the first point, wherein the range of integer disparity values is disposed along a diagonal epipolar line extending from the first point and the position on the second image; and determine which disparity point of the potential disparity points corresponds to the first point depending on a matching cost of the individual potential disparity points determined by using feature values associated with multiple neighbor points near the individual potential disparity points and by using feature values associated with the first point.

By another implementation, the instructions also may cause the computing device to include that the diagonal pair of images corresponds to a diagonal arrangement of cameras in a camera array that captured the images, the instructions causing the computing device to determine the matching cost by using bilinear interpolation with the feature values, wherein the feature values are based on color, gradient, or grayscale values at or near the neighbor points; select the four closest whole pixel points around the potential disparity point of non-integer coordinates as the neighbor points; determine the matching cost based on feature differences between the features values associated with the first point on the first image and the feature values associated with the individual neighbor points; determine a feature difference value for individual neighbor points based on the feature differences of points in a support region on the first image and associated with the first point and support regions on the second image each associated with individual neighbor points.

The instructions also include that at least one of the support regions is determined by including feature values of contiguous pixels points and including a neighbor point that all have a feature value of the same type of feature that meets a criteria; wherein the feature difference value is determined by using the overlapping pixel locations that are common in an overlap of the support region of a neighbor point on the second image and the support region of the first point on the first image; wherein the feature difference value is determined by using sum of absolute differences of the feature values of the area formed by the overlapping pixel locations; wherein the matching cost for a potential disparity point is determined, at least in part, by totaling the feature difference value from each of the neighbor points of the potential disparity point; wherein the matching cost for a potential disparity point is determined, at least in part, by weighting the feature difference values from individual neighbor points of the potential disparity point depending on how close the neighbor point is to a non-integer disparity point associated with the potential disparity point; and the system having the diagonal disparity unit to select the potential disparity point as the final potential disparity point that has the lowest matching cost.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of increasing integer disparity accuracy for camera images with a diagonal layout, comprising:
    obtaining image data of multiple images of the same scene having at least one diagonally arranged pair of the images including a first image and a second image;
    determining multiple corresponding potential disparity points on the second image to correspond to a first point on a first image, and wherein each potential disparity point is displaced one of a range of integer disparity values away from a position on the second image that corresponds to the location on the first image of the first point, wherein the range of integer disparity values is disposed along a diagonal epipolar line extending from the first point and the position on the second image;
    determining which disparity point of the potential disparity points corresponds to the first point depending on a matching cost of the individual potential disparity points determined by using feature values associated with multiple neighbor points near the individual potential disparity points and by using feature values associated with the first point; and
    determining the matching cost based on feature differences between the feature values associated with the first point on the first image and the feature values associated with the individual neighbor points comprising:
        determining a feature difference value for individual neighbor points based on the feature differences of points of the feature values in a support region on the first image and associated with the first point and support regions on the second image each associated with individual neighbor points.

2. The method of claim 1 wherein the diagonal pair of images corresponds to a diagonal arrangement of cameras in a camera array that captured the images.

3. The method of claim 1 comprising determining the matching cost by using bilinear interpolation with the feature values.

4. The method of claim 1 comprising selecting the four closest whole pixel points around the potential disparity point of non-integer coordinates as the neighbor points.

5. The method of claim 1 wherein the feature values are based on color, gradient, or grayscale values at or near the neighbor points.

6. The method of claim 1 wherein at least one of the support regions is determined by including feature values of contiguous pixels points and including a neighbor point that all have a feature value of the same type of feature that meets a criteria.

7. The method of claim 1 wherein the feature difference value is determined by using the overlapping pixel locations that are common in an overlap of the support region of a neighbor point on the second image and the support region of the first point on the first image.

8. The method of claim 7 wherein the feature difference value is determined by using sum of absolute differences of the feature values of the area formed by the overlapping pixel locations.

9. The method of claim 1 wherein the matching cost for a potential disparity point is determined, at least in part, by totaling the feature difference value from each of the neighbor points of the potential disparity point.

10. The method of claim 1 wherein the matching cost for a potential disparity point is determined, at least in part, by weighting the feature difference values from individual neighbor points of the potential disparity point depending on how close the neighbor point is to a non-integer disparity point associated with the potential disparity point.

11. The method of claim 1 comprising selecting the potential disparity point as the final potential disparity point that has the lowest matching cost.

12. The method of claim 1 wherein the diagonal pair of images corresponds to a diagonal arrangement of cameras in a camera array that captured the images;
the method comprising:
determining the matching cost by using bilinear interpolation with the feature values, wherein the feature values are based on color, gradient, or grayscale values at or near the neighbor points;
selecting the four closest whole pixel points around the potential disparity point of non-integer coordinates as the neighbor points;
wherein at least one of the support regions is determined by including feature values of contiguous pixels points and including a neighbor point that all have a feature value of the same type of feature that meets a criteria;
wherein the feature difference value is determined by using the overlapping pixel locations that are common in an overlap of the support region of a neighbor point on the second image and the support region of the first point on the first image;
wherein the feature difference value is determined by using sum of absolute differences of the feature values of the area formed by the overlapping pixel locations;
wherein the matching cost for a potential disparity point is determined, at least in part, by totaling the feature difference value from each of the neighbor points of the potential disparity point;
wherein the matching cost for a potential disparity point is determined, at least in part, by weighting the feature difference values from individual neighbor points of the potential disparity point depending on how close the neighbor point is to a non-integer disparity point associated with the potential disparity point; and
the method comprising selecting the potential disparity point as the final potential disparity point that has the lowest matching cost.

13. A computer-implemented system of increasing integer disparity accuracy for camera images with a diagonal layout, comprising:
a display;
at least one processor communicatively coupled to the display;
at least one memory communicatively coupled to at least one processor; and
a diagonal disparity unit operated by the processor and to:
obtain image data of multiple images of the same scene having at least one diagonally arranged pair of the images including a first image and a second image;
determine multiple corresponding potential disparity points on the second image to correspond to a first point on a first image, and wherein each potential disparity point is displaced one of a range of integer disparity values away from a position on the second image that corresponds to the location on the first image of the first point, wherein the range of integer disparity values is disposed along a diagonal epipolar line extending from the first point and the position on the second image;
determine which disparity point of the potential disparity points corresponds to the first point depending on a matching cost of the individual potential disparity points determined by using feature values associated with multiple neighbor points near the individual potential disparity points and by using feature values associated with the first point; and
determining the matching cost based on feature differences between the feature values associated with the first point on the first image and the feature values associated with the individual neighbor points comprising:
determining a feature difference value for individual neighbor points based on the feature differences of points of the feature values in a support region on the first image and associated with the first point and support regions on the second image each associated with individual neighbor points.

14. The system of claim 13 wherein the diagonal pair of images corresponds to a diagonal arrangement of cameras in a camera array that captured the images.

15. The system of claim 13 wherein the diagonal disparity unit is to determine the matching cost by using bilinear interpolation with the feature values.

16. The system of claim 13 wherein the diagonal disparity unit is to select the four closest whole pixel points around the potential disparity point of non-integer coordinates as the neighbor points.

17. The system of claim 13 wherein the feature values are based on color, gradient, or grayscale values at or near the neighbor points.

18. The system of claim 13 wherein the matching cost for a potential disparity point is determined, at least in part, by totaling the feature difference value from each of the neighbor points of the potential disparity point; and by weighting the feature difference values from individual neighbor points of the potential disparity point depending on how close the neighbor point is to a non-integer disparity point associated with the potential disparity point.

19. The system of claim 13 wherein the diagonal pair of images corresponds to a diagonal arrangement of cameras in a camera array that captured the images, the system having the diagonal disparity unit operated by the processor and to:
determine the matching cost by using bilinear interpolation with the feature values, wherein the feature values are based on color, gradient, or grayscale values at or near the neighbor points;
select the four closest whole pixel points around the potential disparity point of non-integer coordinates as the neighbor points;
wherein at least one of the support regions is determined by including feature values of contiguous pixels points and including a neighbor point that all have a feature value of the same type of feature that meets a criteria;
wherein the feature difference value is determined by using the overlapping pixel locations that are common in an overlap of the support region of a neighbor point on the second image and the support region of the first point on the first image;
wherein the feature difference value is determined by using sum of absolute differences of the feature values of the area formed by the overlapping pixel locations;
wherein the matching cost for a potential disparity point is determined, at least in part, by totaling the feature difference value from each of the neighbor points of the potential disparity point;
wherein the matching cost for a potential disparity point is determined, at least in part, by weighting the feature difference values from individual neighbor points of the potential disparity point depending on how close the neighbor point is to a non-integer disparity point associated with the potential disparity point; and
the system having the diagonal disparity unit to select the potential disparity point as the final potential disparity point that has the lowest matching cost.

20. A non-transitory computer-readable medium having stored thereon instructions that when executed cause a computing device to:
- obtain image data of multiple images of the same scene having at least one diagonally arranged pair of the images including a first image and a second image;
- determine multiple corresponding potential disparity points on the second image to correspond to a first point on a first image, and wherein each potential disparity point is displaced one of a range of integer disparity values away from a position on the second image that corresponds to the location on the first image of the first point, wherein the range of integer disparity values is disposed along a diagonal epipolar line extending from the first point and the position on the second image;
- determine which disparity point of the potential disparity points corresponds to the first point depending on a matching cost of the individual potential disparity points determined by using feature values associated with multiple neighbor points near the individual potential disparity points and by using feature values associated with the first point; and
- determining the matching cost based on feature differences between the feature values associated with the first point on the first image and the feature values associated with the individual neighbor points comprising:
  - determining a feature difference value for individual neighbor points based on the feature differences of points of the feature values in a support region on the first image and associated with the first point and support regions on the second image each associated with individual neighbor points.

21. The medium of claim 20 wherein the diagonal pair of images corresponds to a diagonal arrangement of cameras in a camera array that captured the images, the instructions causing the computing device to:
- determine the matching cost by using bilinear interpolation with the feature values, wherein the feature values are based on color, gradient, or grayscale values at or near the neighbor points;
- select the four closest whole pixel points around the potential disparity point of non-integer coordinates as the neighbor points;
- wherein at least one of the support regions is determined by including feature values of contiguous pixels points and including a neighbor point that all have a feature value of the same type of feature that meets a criteria;
- wherein the feature difference value is determined by using the overlapping pixel locations that are common in an overlap of the support region of a neighbor point on the second image and the support region of the first point on the first image;
- wherein the feature difference value is determined by using sum of absolute differences of the feature values of the area formed by the overlapping pixel locations;
- wherein the matching cost for a potential disparity point is determined, at least in part, by totaling the feature difference value from each of the neighbor points of the potential disparity point;
- wherein the matching cost for a potential disparity point is determined, at least in part, by weighting the feature difference values from individual neighbor points of the potential disparity point depending on how close the neighbor point is to a non-integer disparity point associated with the potential disparity point; and
- the system having the diagonal disparity unit to select the potential disparity point as the final potential disparity point that has the lowest matching cost.

* * * * *